(12) United States Patent
Wang et al.

(10) Patent No.: US 8,107,414 B2
(45) Date of Patent: Jan. 31, 2012

(54) METHOD AND COMMUNICATION DEVICE FOR EXPANDED COVERAGE IN A MESH NETWORK

(75) Inventors: Feng Wang, Austin, TX (US); Rias Muhamed, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1211 days.

(21) Appl. No.: 11/353,354

(22) Filed: Feb. 14, 2006

(65) Prior Publication Data

US 2007/0189247 A1 Aug. 16, 2007

(51) Int. Cl.
*H04W 4/00* (2009.01)
(52) U.S. Cl. .................. 370/328; 370/331; 455/432.1; 455/448; 455/436
(58) Field of Classification Search .................. 370/328, 370/331; 455/436, 432.1, 448
See application file for complete search history.

(56) References Cited

U.S. PATENT DOCUMENTS

| | | | |
|---|---|---|---|
| 6,728,232 B2 | 4/2004 | Hasty, Jr. et al. | |
| 6,970,444 B2 | 11/2005 | Chwieseni et al. | |
| 7,606,175 B1 * | 10/2009 | Maufer | 370/255 |
| 2004/0264451 A1 * | 12/2004 | Kujala et al. | 370/389 |
| 2005/0122929 A1 | 6/2005 | Zuniga | |
| 2005/0223086 A1 | 10/2005 | Raverdy et al. | |
| 2006/0200678 A1 * | 9/2006 | Yamada et al. | 713/182 |
| 2006/0234719 A1 * | 10/2006 | Demirhan et al. | 455/453 |

OTHER PUBLICATIONS

NETGEAR, "RangeMax™ Wireless Access Point"; Webite last visited Feb. 13, 2006, 5 pages.

* cited by examiner

*Primary Examiner* — Patrick Edouard
*Assistant Examiner* — Chuck Huynh
(74) *Attorney, Agent, or Firm* — Yudell Isidore Ng Russell PLLC

(57) ABSTRACT

An apparatus and method (200) are disclosed for expanded coverage in a mesh network (100). A communication device (140) incorporating teachings of the present disclosure may include, for example, a controller (302) managing operation of a transceiver (320) in communication with the mesh and programmed to acquire (202) a network identification from a mesh node (120), transmit (204) the network identification and appear as another mesh node to clients, and forward traffic from wireless clients to the mesh node. The communication device can operate (206) as a node in the mesh using the network identification and operate (208) as an independent router using a separate wireless router identifier. In another embodiment, the controller can be programmed to detect a network identification of an access point within a coverage area of a communication device (120), transmit a join message, and transmit authenticating information and security associations. Additional embodiments are disclosed.

19 Claims, 3 Drawing Sheets

GN - Gateway Node
WC - Wireless Client
WAP - Wireless Access Point
WN - Wireless Node GN – Gateway Node
WC – Wireless Client
WAP – Wireless Access Point
WN – Wireless Node

100

METHOD AND COMMUNICATION DEVICE FOR EXPANDED COVERAGE IN A MESH NETWORK

FIELD OF THE DISCLOSURE

The present disclosure relates generally to wireless mesh networks, and more specifically to methods and systems for improving performance of wireless mesh networks.

BACKGROUND

Deployment of Wi-Fi mesh networks is becoming prevalent. "Wi-Fi" is short for wireless fidelity and is meant to be used generically to any type of IEEE 802.11 network. Some Wi-Fi mesh network applications include providing broadband access in metro-areas (Metro-Wi-Fi), for underserved areas, and campus environments. The Wi-Fi network avoids the use of a wired connection to each of the Wi-Fi nodes and instead enables several nodes to cover a large geographic area (up to a few sq. miles) by interconnecting via a wireless mesh to a gateway node that has wired (or in some cases, wireless) connectivity to the Internet or other data network.

Wi-Fi being by design a low power system and prone to interference from other systems operating in the same frequency band, the area over which reliable coverage can be achieved from a Wi-Fi node is fairly limited. Therefore, achieving good coverage over large geographic areas means deploying a large number of access points or mesh nodes, which can be cost prohibitive. In addition to reliability concerns stemming from interference and weak signal and fading conditions, there is also the need to provide redundancy in case of failure, which may be achieved by having nodes with redundant or overlapping coverage areas. This also implies higher cost.

A need therefore arises for communication devices and methods that overcome the detriments described above.

DETAILED DESCRIPTION

Figure 1:
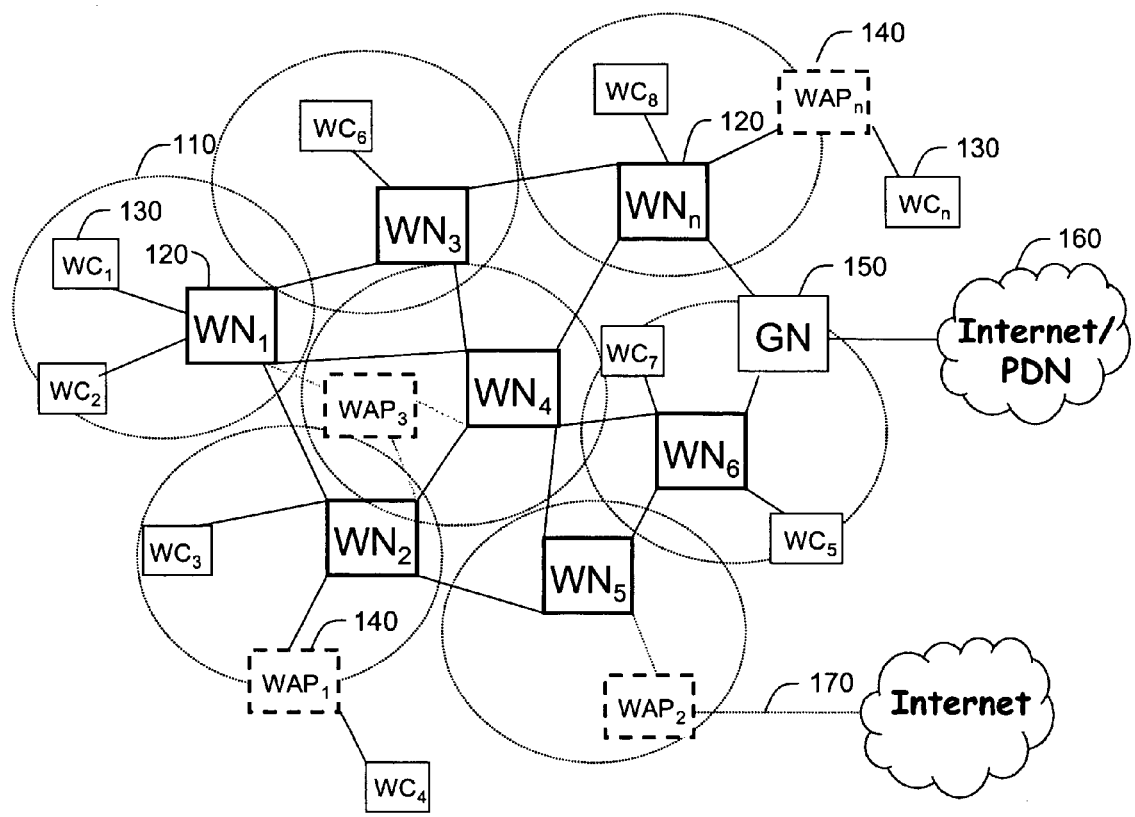
FIG. 1 depicts an exemplary embodiment of a mesh network using communication devices that provide improved performance in accordance with the embodiments.

Embodiments in accordance with the present disclosure provide a method and communication device for expanded coverage in a mesh network, also known as a mesh.

In a first embodiment of the present disclosure, a communication device such as a wireless access point or wireless router can include a controller that manages operation of a transceiver in communication with a mesh network. The communication device can further include a transceiver coupled to the controller. The controller can be programmed to acquire a network identification from a mesh node in the mesh network, transmit the network identification and appear as another mesh node to one or more wireless clients, and forward traffic from wireless clients to the mesh node. The network identification can be an extend service set identification (ESSID) as the network identification. The wireless access point can communicate with the mesh node using a Layer 2 link interface as an extension to the Wi-Fi Medium Access Control (MAC) Layer protocol. The controller can further be programmed to receive a MAC control message from the mesh node requesting to join the mesh network and to send a rejection or an accept message in response to the MAC control message. In response to transmitting the accept message, the communication device can receive authenticating information including the network identification as well as security associations. The communication device can join the mesh network in response to receiving the authenticating information and security associations. Note, the communication device can operate as a node in the mesh network using the network identifier and operate as an independent wireless router using a separate wireless router identifier.

In a second embodiment of the present disclosure, communication device such as a mesh node in a wireless mesh network can include a controller that manages operation of a transceiver in communication with a mesh network. The controller can be programmed to detect a network identity of a wireless access point within a coverage area of the communication device, transmit a join message to the wireless access point in response to detecting the network identity of the wireless access point, and transmit to the wireless access point authenticating information and security associations in response to an affirmative response to the join message. Note, detection of the network identity of the wireless access point can be done using WiFi sniffing, the join message can be in the form of a MAC control message to the wireless access point, and the authenticating information can include a service set identification (SSID) of the communication device. The communication device can further include a storage medium in the mesh network and accessible by the communication device for storing network identifiers for all wireless access points affiliated with the mesh network. The controller can be programmed to evaluate all wireless access points affiliated with the mesh network over time with respect to coverage and reliability.

In a third embodiment of the present disclosure, a method in a wireless access device for expanded coverage in a mesh network can include the steps of acquiring a mesh network identification using a service set identification (SSID) or an extended service set identification (ESSID) from a mesh node in the mesh network, transmitting the mesh network identification to one or more wireless clients, operating as a node in the mesh network using the network identifier, and operating as an independent wireless router using a separate wireless router identifier. The method can further include the step of expanding the coverage area and reliability of the mesh network using the wireless access device.

Referring to FIG. 1, a Wi-Fi mesh network 100 in accordance with the embodiments are shown including mesh nodes 120 marked in the diagram as $WN_1$ through $WN_n$ having respective coverage zones 110. These nodes are interconnected with one another through a mesh routing protocol, and are also connected to a Gateway Node (GN) 150 that has a wired or wireless backhaul connectivity to the Internet 160 or other IP data network. Wi-Fi access points that are not originally part of the Wi-Fi mesh are wireless access points 140 denoted as $WAP_1$ through $WAP_n$. These Wi-Fi access points may actually belong to private subscribers such as those installed in homes and office buildings. The Wi-Fi access points 140 can also have their own connection 170 to the Internet.

The embodiments herein do not necessarily attempt to use an alternate connection to the Internet, but can use the Wi-Fi Access Point 140 as a relaying agent for the mesh network so that clients 130 that are not within reach of the existing Wi-Fi mesh nodes 120 can reach the mesh via the Wi-Fi Access Points 140 that are external to the mesh network but eventually join the mesh network by invitation. In FIG. 1, for example, the wireless client $WC_n$ (130) is outside the range of the closest Wi-Fi mesh node $WN_n$ (130), and hence cannot obtain any services through the traditional mesh network. However, a mechanism to make the $WAP_n$ 140 as part of the mesh network can then enable the wireless client $WC_n$ to potentially use the services provided by the mesh network. $WAP_n$ (140) does not necessarily need to have the full functionality of a Wi-Fi mesh node (e.g., the ability to take packets from one mesh node to another using an intelligent routing algorithm), but it can simply just be used to relay packets to one of the nearest mesh nodes (120).

In order for any Access Point 140 to become part of the mesh network 100, the WAP 140 can appear to the end user (wireless clients such as $WC_n$) 130 to be just like another mesh node. Appearing like another mesh node can involve the WAP 140 advertising itself as having the same network identity (more precisely, ESSID) as the mesh network. The WAP 140 can then forward all traffic it receives from clients 130 connected on that ESSID to the closest mesh node. If there are multiple mesh nodes that are within the reach of WAP 140, then it may require additional routing intelligence to determine which mesh node to forward packets to. Optionally, the WAP 140 can also be capable of handing over connections to and from other mesh nodes.

In another aspect of the embodiments herein, a new protocol for communication between the WN or mesh nodes 120 and the WAP or wireless access points 140 is used. Since both WN 120 and WAP 140 have the same Layer 2 link interface (Wi-Fi), this new protocol can be implemented at the link layer as an extension to the Wi-Fi Medium Access Control (MAC) Layer protocol. The protocol can include the following steps between the WN 120 and the WAP 140 devices:

1. In the WN 120, a mechanism can be used to detect the network identity of the Access Points (140) within the coverage area 110 of the WN 120. The mechanism can utilize a Wi-Fi sniffing capability that is quite commonly implemented in existing Wi-Fi communication routers.
2. The WN 120 can create and send a MAC control message to the WAP 140 requesting whether the WAP 140 can join the mesh network.
3. The WAP 140 may choose to either reject this request or reply with an accept message to the WN 120. Communication products can be designed such that the user can configure the WAP 140 to respond either with an accept or reject.
4. Upon receiving an accept message, the WN 120 can send the necessary credentials to the WAP 140 that allows it to establish a connection with the WN 120. The credentials may include the service set identifier (SSID) of the WN 120 as well as any security associations.
5. Upon receiving the credentials, the WAP 140 may configure itself with these credentials and join the mesh network 100. If the WAP 140 is capable of operating with multiple SSIDs (i.e. multiple virtual APs), then the WAP 140 can assume the mesh network identity in addition to its existing identity instead of replacing it. In this manner, joining the mesh does not disrupt the existing clients that are associated with the wireless access point 140. The WAP 140 can perform the duties of the mesh in addition to serving its existing clients. Clients that want to join the mesh network can now associate with the mesh identity that the AP is now broadcasting.
6. If multiple WAP(s) 140 exist, the mesh network 100 can store all WAP(s) or their corresponding identifiers and their locations in a data base and evaluate the WAP performance over time to optimize coverage or redundancy for reliability by allowing or disallowing any WAP(s) to act as WN(s).

Mesh WiFi networks are being rapidly deployed by municipalities in US and overseas. A lot of them are trying to achieve uniform coverage and services over the whole city for indoor and out-door coverage. However due to the unlicensed band operation of WiFi system, it is unlikely this goal can be achieved economically. The embodiments described herein defines a new protocol that allows the Mesh network through its Mesh Nodes to invite other existing WAP(s) in its vicinity to join the mesh network as Mesh Node(s) at essentially no additional cost to the provider of the mesh network. This is an economic way to extend the coverage or build redundancy to the existing mesh network.

Figure 2:
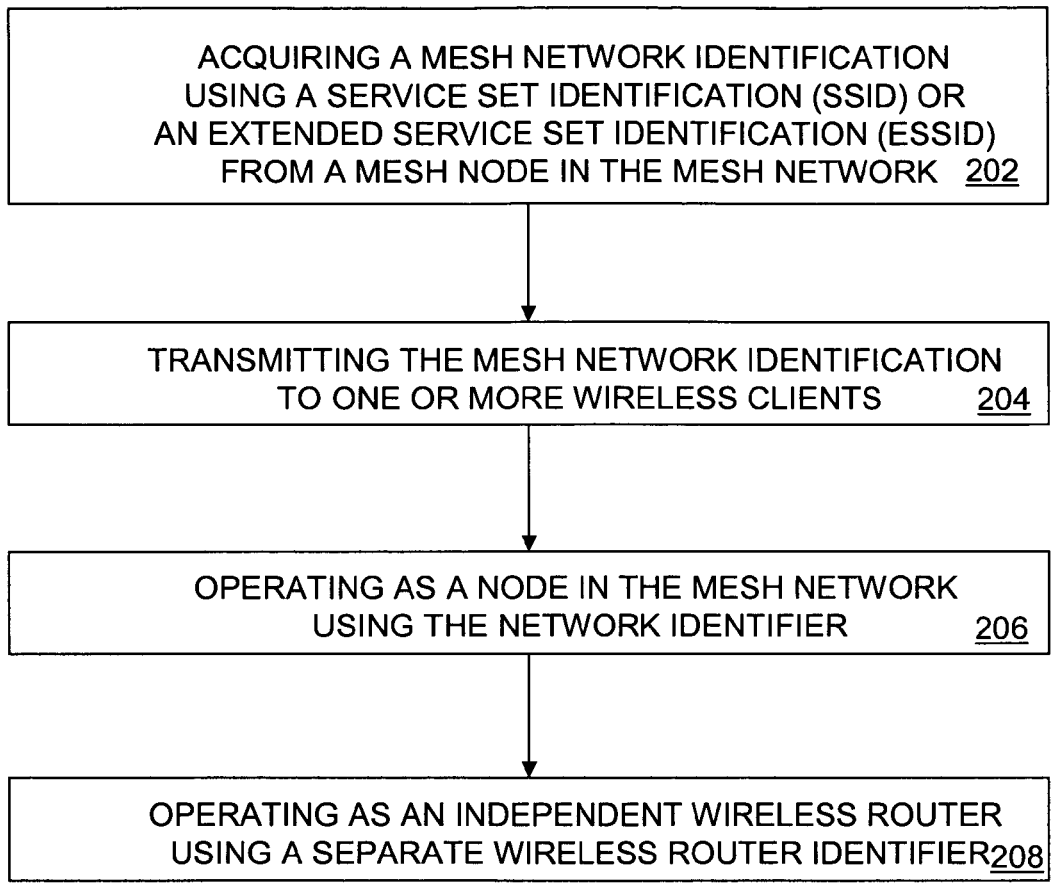
FIG. 2 depicts an exemplary method operating a communication device in the mesh network.

FIG. 2 illustrates an exemplary method 200 in a wireless access device such as the WAP 140 (as discussed with reference to FIG. 1) for expanded coverage in a mesh network. The method 200 can include the step 202 of acquiring a mesh network identification using a service set identification (SSID) or an extended service set identification (ESSID) from a mesh node in the mesh network, transmitting the mesh network identification to one or more wireless clients at step 204, operating as a node in the mesh network using the network identifier at step 206, and operating as an independent wireless router using a separate wireless router identifier at step 208. The method 200 effectively expands the coverage area and reliability of the mesh network by using the wireless access device as an additional mesh node or pseudo-node.

Figure 3:
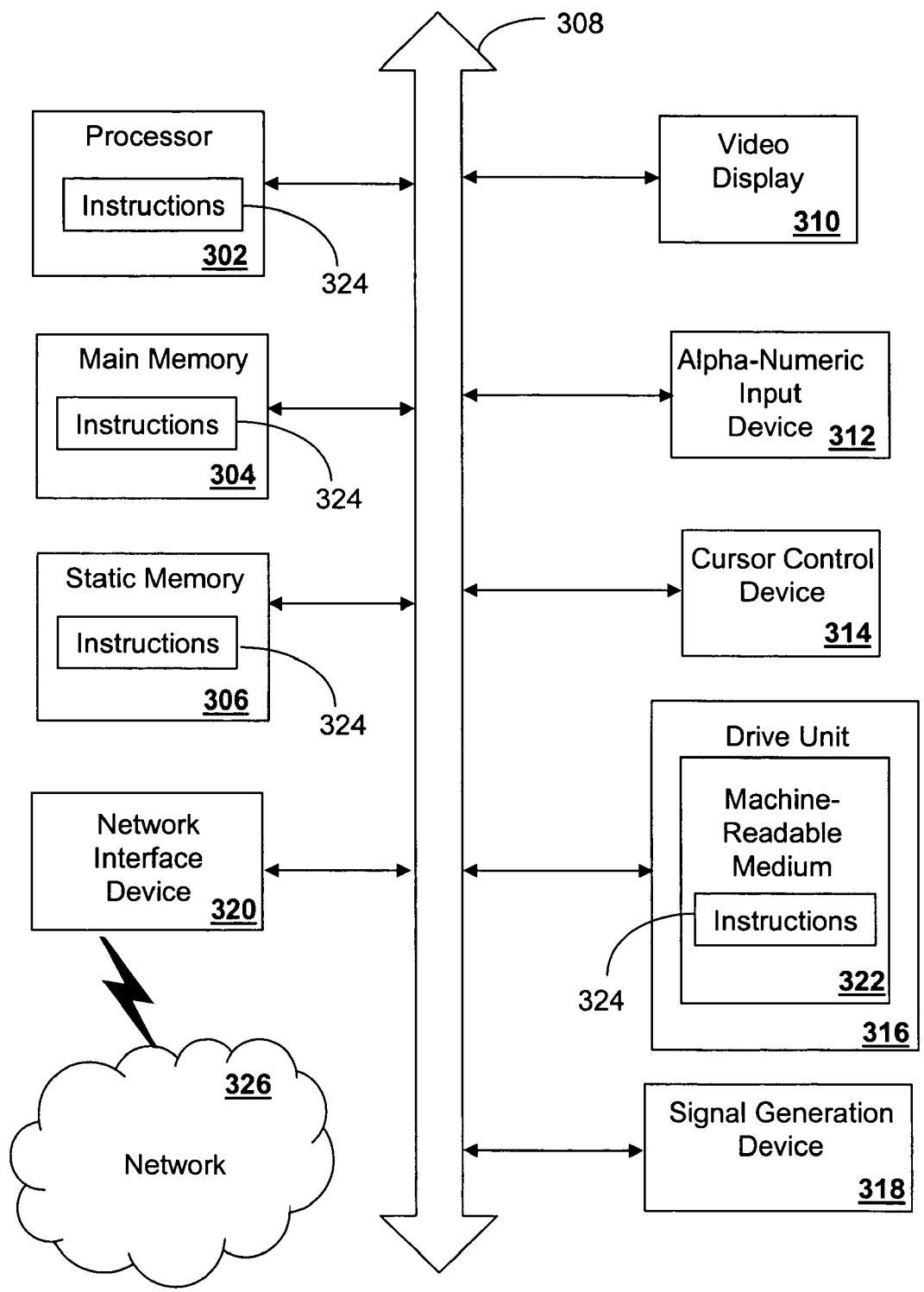
FIG. 3 depicts an exemplary diagrammatic representation of a machine in the form of a computer system within which a set of instructions, when executed, may cause the machine to perform any one or more of the methodologies disclosed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router or wireless network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
   a memory;
   a transceiver configured to communicate with a mesh network coupled to a first wide area network and a first plurality wireless client devices including a respective first plurality of first displays to display first information to a respective first plurality of first users operated by the respective first plurality of first users and configured to utilize a plurality of wireless network identifications that includes at least one of a plurality of service set identifications (SSIDs) and a plurality of extended service set identifications (ESSIDs); and a controller, coupled to the memory and the transceiver, that manages operation of the transceiver in communication with the mesh network coupled to the first wide area network and with the first plurality wireless client devices, wherein the controller is configured to:
store, in the memory, a first wireless network identification of the plurality of wireless network identifications usable to communicate with the first plurality wireless client devices;
receive, via the transceiver, a second wireless network identification of the plurality of wireless network identifications as a mesh network identification from a first mesh node in the mesh network;
receive, via the transceiver and the second wireless network identification, a medium access control (MAC) message that includes an accept message to join the mesh network;
store, in the memory, the second wireless network identification in addition to the first wireless network identifier;
transmit, to the first plurality wireless client devices, the second wireless network identification to appear as a second mesh node in the mesh network to the first plurality of wireless client devices; and
forward, based on the second wireless network identification, traffic from the first plurality of wireless client devices to the first mesh node;
operate as the second node in the mesh network using the second wireless network identification; and
operate as a first wireless router, coupled to an Internet and independent of the mesh network, by providing wireless access to the Internet via the transceiver and the first wireless network identification to a second plurality of wireless client devices including a second plurality of respective second displays to display second information to a respective second plurality of second users operated by the respective second plurality of second users using the first wireless network identifier.

2. The communication device of claim 1, wherein the controller is further configured to:
receive, via the transceiver and the second wireless network identification, security association credentials of the mesh network; and
configure the transceiver for use of the security association credentials.

3. The communication device of claim 1, wherein the communication device is at least one of a wireless access point and a wireless router.

4. The communication device of claim 3, wherein the wireless access point communicates with the first mesh node using a Layer 2 link interface as an extension to a Wi-Fi MAC Layer protocol.

5. The communication device of claim 1, wherein the controller is further configured to receive, via the transceiver and the second wireless network identification, security information associated with the mesh network.

6. The communication device of claim 5, wherein the controller is further configured to join the mesh network in response to receiving the security information associated with the mesh network.

7. The communication device of claim 1, wherein the controller is further configured to:
operate as a second wireless router, coupled to the Internet and independent of the mesh network, by providing wireless access to the Internet via the transceiver and a third wireless network identification of the plurality of wireless network identifications to a third plurality of wireless client devices including a third plurality of respective third displays to display third information to a respective third plurality of third users operated by the respective third plurality of third users using the third wireless network identifier.

8. A non-transitory computer-readable storage medium operating in a communication device configured to implement a plurality of virtual wireless access points, comprising instructions, which when executed by a processor of the communication device, cause the communication device to perform:
storing a first service set identifier (SSID); transmitting the first SSID to appear as a first virtual wireless access point of the plurality of virtual wireless access points to a first plurality of wireless client devices including a respective plurality of first displays to display first information to a respective plurality of first users and operated by the respective plurality of first users;
receiving, via a second virtual wireless access point of the plurality of virtual wireless access points, a medium access control (MAC) message that includes an accept message to join the mesh network;
transmitting, via the second virtual wireless access point, a message to accept the accept message to join the mesh network coupled to an Internet;
receiving, via the second virtual wireless access point, a second SSID as a mesh network identification from a first mesh node in the mesh network; storing the second SSID in addition to the first SSID;
transmitting the second SSID to appear as a second mesh node in the mesh network to a second plurality of wireless client devices including a respective plurality of second displays to display second information to a respective plurality of second users and operated by the respective plurality of second users;
receiving, via the first virtual wireless access point and the first SSID, first traffic from the first plurality of wireless client devices;
forwarding the first traffic from the first plurality of wireless client devices to the first mesh node;
receiving, via the second virtual wireless access point and the second SSID, second traffic from the second plurality of wireless client devices; forwarding the second traffic from the second plurality of wireless client devices to the first mesh node;
operating as the second node in the mesh network using the second SSID in communicating with the first mesh node and the second plurality of wireless client devices.

9. The non-transitory computer-readable storage medium of claim 8, further comprising instructions, which when executed by the processor of the communication device, cause the communication device to perform:
communicating with the first mesh node using a Layer 2 link interface as an extension to a Wi-Fi MAC Layer protocol.

10. The non-transitory computer-readable storage medium of claim 8, wherein the plurality of virtual wireless access points includes a plurality of IEEE 802.11 virtual wireless access points.

11. A wireless device, comprising:
a processor;
a network interface device coupled to the processor and configured to wirelessly communicate with a plurality of wireless devices; and a memory coupled to the processor;
wherein the memory includes instructions, which when executed by the processor, cause the wireless device to perform:
   transmitting, via the network interface device, a medium access control (MAC) message to a first wireless device of the plurality of wireless devices, wherein the MAC message includes a request to join a mesh network, wherein the mesh network includes the first wireless device;
   receiving, via the network interface device, a first network identifier from the first wireless device, wherein the first network identifier includes a first service set identifier (SSID);
   storing the first network identifier in the memory;
   transmitting, via the network interface device, the first network identifier to a second wireless device of the plurality of wireless devices, wherein the second wireless device includes a first display to display first information to a first user and is configured to be operated by the first user;
   receiving, via the network interface device and via the first network identifier, first data from the second wireless device;
   transmitting, via the network interface device, the first data from the second wireless device to the first wireless device;
   transmitting, via the network interface device, a second network identifier that includes a second SSID, different from the first SSID, to a third wireless device of the plurality of wireless devices, wherein the third wireless device includes a second display to display second information to a second user and is configured to be operated by the second user;
   receiving, via the network interface device and via the second network identifier, second data from the third wireless device; and
   transmitting, via the network interface device and via the second network identifier, the second data from the third wireless device to the first wireless device.

12. The wireless device of claim 11,
wherein the mesh network is coupled to a wide area network (WAN); and
wherein the data from the second wireless device is addressed to WAN.

13. The wireless device of claim 12, wherein the WAN includes an Internet.

14. The wireless device of claim 11, wherein the first wireless device is a wireless access point.

15. The wireless device of claim 11, wherein the wireless device is a wireless access point.

16. A method, comprising:
storing a first service set identifier (SSID) in a memory;
transmitting, via a network interface, the first SSID to appear as a first virtual wireless access point of a plurality of virtual wireless access points to a first plurality of wireless client devices including a respective plurality of first displays to display first information to a respective plurality of first users and operated by the respective plurality of first users;
transmitting, via the network interface device, a first medium access control (MAC) message to a first wireless mesh device of a plurality of wireless mesh devices, wherein the first MAC message includes a first request to join a mesh network, wherein the mesh network includes the first wireless mesh device;
receiving, via the network interface device, a second SSID as a mesh network identifier from the first wireless mesh device
storing the second SSID in the memory;
transmitting, via the network interface device, the second SSID to appear as a second virtual wireless access point of the plurality of virtual wireless access points to a second plurality of wireless client devices including a respective plurality of second displays to display second information to a respective plurality of second users and operated by the respective plurality of second users;
receiving, via the network interface device and via the first SSID, first data from the first plurality of wireless client devices;
transmitting, via the network interface device and via the second SSID, the first data to the first wireless mesh device;
receiving, via the network interface device and via the second SSID, second data from the second plurality of wireless client devices; and
transmitting, via the network interface device and via the second SSID, the second data to the first wireless mesh device.

17. The method of claim 16, further comprising:
receiving, via the network interface device, a second MAC message from a second wireless mesh device of the plurality of wireless mesh devices, wherein the second MAC message includes a second request to join the mesh network;
transmitting, via the network interface device, the second SSID to the third wireless device;
receiving, via the network interface device and via the second SSID, third data from the second wireless mesh device; and
transmitting, via the network interface device and via the second SSID, the third data to the first wireless mesh device.

18. The method of claim 17, wherein the third data includes fourth data from a third wireless mesh device of the plurality of wireless mesh devices wirelessly coupled to the second wireless mesh device.

19. The method of claim 18
wherein the mesh network is coupled to an Internet; and
wherein the data from the third wireless device is directed to the Internet.

* * * * *